Oct. 17, 1961 R. J. SPINRAD 3,005,158

CORE SATURATION BLOCKING OSCILLATOR

Filed Oct. 20, 1959

INVENTOR.
ROBERT J. SPINRAD

BY

Roland A. Anderson
Attorney

United States Patent Office 3,005,158

Patented Oct. 17, 1961

3,005,158

CORE SATURATION BLOCKING OSCILLATOR

Robert J. Spinrad, Brookhaven Township, Suffolk County, N.Y., assignor to the United States of America as represented by the United States Atomic Energy Commission Filed Oct. 20, 1959, Ser. No. 847,672

3 Claims. (Cl. 328—58)

The present invention relates to a core saturation controlled blocking oscillator and more particularly to a core saturation controlled blocking oscillator in which the regulation of core saturation acts as an external control of pulse width.

Blocking oscillators are widely used as generators of short pulses and are favored for use in digital systems because of the relatively square pulses which can be produced at low output impedances. As evidenced by the large number of published descriptions of a variety of blocking oscillator circuits, this type of circuit is highly versatile and finds its use in a wide variety of applications. When such a circuit is triggered it produces a pulse of some particular duration which may be described as the natural pulse duration or width of the circuit. In the use of blocking oscillator circuits, ability to control pulse width is an important factor which has been subject to a high degree of investigation and a large variety of control arrangements. Heretofore, it has only been possible to regulate the width of the pulses in the direction of reduction of the natural pulse width of the circuit. This is done in existing blocking oscillator circuits by saturation of the vacuum tube or transistor element which determines the point at which the circuit degenerates and so brings to an end the pulse. One limitation found in the use of present blocking oscillator circuits is in this necessity to limit the pulse width control to reduction in the natural width of the pulse. This is evidenced by the following techniques now generally in use to shorten the natural width of the pulses produced by such circuits. For example, loop gain is reduced either by modifying the turns ratio or the transformer or by degeneration in the grid or cathode of the vacuum tube element, or the vacuum tube may be provided with self-biasing to reduce the effective drive, or external short-circuited or open-circuited delay lines may be used to insert a "turn-off" signal into the loop. These arrangements, although they do successfully shorten and subject to control the reduction in the natural pulse width of the circuit, have serious drawbacks. The first two of these arrangements have an adverse effect on the pulse shape by making it more of a sinusoid than square, while the last of these arrangements adversely affects the circuit's recovery time.

The invention herein described is designed to provide an external pulse width control for a blocking oscillator which avoids many of the disadvantages involved in the previous techniques of blocking oscillator control described above. It has been found and such principle has been incorporated into this invention that by placing the control of pulse width in an element external to the active element, it is possible to provide a wider range of pulse width control without adversely affecting the shape of the pulse or the circuit's recovery time. The blocking oscillator circuit of this invention incorporates a relationship of components such that the transformer goes into saturation before the vacuum tube reaches its saturation point, thereby triggering the saturation of the latter. This permits as will be later seen convenient provision to be made to exercise some control over the transformer in regulating the point at which the latter goes into saturation.

Thus a first object of this invention is to provide a blocking oscillator in which pulse width is regulated by means external to the active element.

It is another object of this invention to provide a blocking oscillator of improved pulse width control.

Another object of this invention is transformer apparatus for exercising pulse width control of a blocking oscillator.

It is still another object of this invention to provide a blocking oscillator in which the pulse duration is substantially independent of external loading and factors internal of the active element.

Other objects and advantages of this invention will hereinafter become more evident from the following description and with reference made to the drawings in which.

Figures 1, 2:
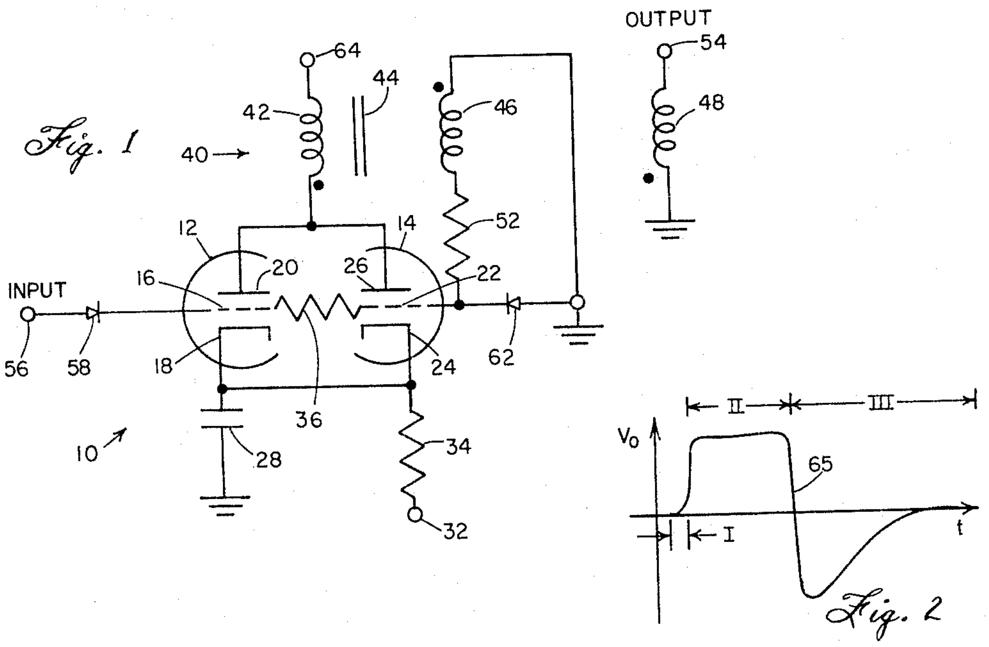
FIGURE 1 is a schematic diagram of a blocking oscillator incorporating the principles of this invention.
FIGURE 2 is a diagram of a typical wave form produced by a blocking oscillator.

Referring to FIGURE 1, there is illustrated schematically a blocking oscillator 10 consisting of a pair of triodes 12 and 14 which together may comprise a twin triode having, in the case of triode 12, a control grid 16, a cathode 18 and an anode 20, and in the case of triode 14, a control grid 22, a cathode 24 and an anode 26. Cathodes 18 and 24 are connected to ground through capacitor 28 and to a source 32 of positive bias voltage through a resistor 34. Control grids 16 and 22 are connected together through a resistor 36 for suppressing parasitic oscillations and the anodes 20 and 26 are connected through the primary coil 42 of a transformer 40 also having a core 44 and secondary coils 46 and 48. The black dots indicate the relative polarity of the coils 42, 46 and 48 as mounted on core 44. Coil 46 acts as the feedback from transformer 40 to control grid 22 of triode 14 and, as indicated by the black dots, the feedback is positive in nature. Coil 46 is connected to control grid 22 through a resistor 52. Coil 48 connected between output 54 and ground delivers the output of the system. The input to oscillator 10 is on control grid 16 from terminal 56 through diode 58. Diode 62 is connected between control grid 22 and ground to permit grid current to be drawn through triode 14 when control grid 22 goes positive and to provide damping when the pulse terminates as is understood in the art. Primary coil 42 is connected from anodes 20 and 26 to terminal 64, the source of B+.

Operation of oscillator 10 in a conventional manner is described in connection with the diagram of a typical wave form 65 produced by such a blocking oscillator, as illustrated in FIGURE 2. It will be seen that the wave form 65 produced has a square shape. As noted from the trace of wave form 65, the latter may be considered as being divided into the three regions of I, II and III. Region I involves a fast rise time and is initiated by the insertion of a positive going pulse on terminal 56 into control grid 16 of triode 12. This causes conduction in triodes 12 and 14 and rapidly increasing current with a resultant voltage drop on the anodes thereof. At region II, a steadily increasing current through primary coil 42 brings about a comparatively unchanging voltage drop across secondaries 46 and 48 and, in the case of secondary 46, of opposite polarity. At some point or interval of time after triodes 12 and 14 begin to conduct, in region II, the saturation point of these triodes is reached, and no further increase in current occurs. Thus, there is no change of current in winding 42, and so the voltage drop across winding 42 disappears rapidly in going from region II to region III. The dip in voltage after region II in the beginning of region III results from an overswing of voltage as is described in conventional transformer theory. The negative swing of the pulse then gradually approaches in asymptotic fashion the normal, non-conducting state of oscillator 10. The pulse width as illustrated in FIGURE 2 and covering region II is the natural pulse width of the circuit, and in accordance with existing techniques and means of varying this pulse width, any controls, superimposed, as described above, results in the variation of pulse width in the direction of shortening this width, and degradation of the pulse shape or attenuation of its amplitude or circuit's recovery time. The operation of blocking oscillator 10, as hereinbefore described, is based on what may be described as the tube saturation mode.

In order to accomplish the purposes of this invention, blocking oscillator 10 is designed so that core 44 of transformer 40 goes into saturation before tube current initially saturates. When oscillator 10 is operating in accordance with this condition, consider that triodes 12 and 14 have been brought into conduction by the insertion of a positive going pulse on terminal 56. Then a steady increase in current through triodes 12 and 14 and through primary coil 42 of transformer 40 results in the eventual saturation of transformer 40. That is, the current steadily increases to provide the necessary magnetizing current. The permeability of core 44 begins to drop sharply as the induction reaches the region of saturation flux conditions. Tubes 12 and 14 can still supply the necessary increase in current to maintain the voltage drop across coil 46. However, the increase in primary current causes the permeability of core 44 to become still lower so that the decrease in inductance demands a still greater increase in current. This action proceeds until tubes 12 and 14 can no longer supply the increase in current due to their running into their own current saturation condition. The pulse then terminates in a manner similar to that shown in FIGURE 2. The important point here is that the termination, although eventually effected by the current saturation of tubes 12 and 14, is triggered by the magnetic saturation of transformer core 44. As will be later seen, this arrangement permits the external control of pulse width over a wider range than heretofore found possible, without the adverse effects mentioned above, and with certain additional benefits to be described below. The operation of oscillator 10 as just described can be termed the core saturation mode.

In order to demonstrate the significance of the core saturation mode of operation in accordance with the principles of this invention as compared to the usual tube saturation mode of operation, and to establish design criteria for application of this invention, reference is made to my discussion of this in "Core Saturation Blocking Oscillator Control" in The Review of Scientific Instruments, August 1959, pp. 647–653, wherein the pulse width in time produced under the tube saturation control is shown to be:

$$(1) \qquad T_I = \frac{I_{sat} L_p}{V} \frac{L_s}{r_g} \frac{L_L}{R_L}$$

where:

$T_I$=pulse length determined by current saturation
$I_{sat}$=saturated plate current
$L_p$=primary inductance
$V$=plate (or collector) voltage
$L_s$=the grid (or base) inductance
$r_g$=effective grid (or base) resistance
$L_L$=the output winding inductance
$R_L$=external load The approximate core saturation controlled pulse width $T_\phi$ in accordance with this invention is also shown to be:

$$(2) \qquad T_\phi = B_{sat} A (N_p/V)$$

where:

$B_{sat}$=flux density of the core at saturation
$A$=effective cross-sectional area of the core
$N_p$=primary turns At this point it should be noted that $T_\phi$ is proportional to $B_{sat}$ which is independent of tube aging and only weakly dependent on temperature over the normal range. Thus an important advantage of this invention is the relative independent of pulse width on the foregoing tube characteristics. For example, the pulse width will not change due to aging of the tube and no change will occur when a new tube is substituted for the one already in use. In a similar manner, when this invention is applied to transistor blocking oscillators, it serves as an excellent buffer to the variation in transistor characteristics.

In determining criteria for establishing oscillator operation in accordance with this invention, the ratio R of $T_I$ to $T_\phi$ is found to be approximately:

$$(3) \qquad R = K \mu I_{sat} N_p / B_{sat}$$

where:

$K$=a factor dependent on the geometry of the core
$\mu$=nonsaturated permeability of the core material The ratio R should be interpreted in the following manner. For values of R less than one, blocking oscillator 10 is operating in the current (tube) saturation mode; that is, where the pulse is terminated initially by the saturation of triodes 12 and 14. For values over one, it is operating in the core saturation mode; that is, where the saturation of triodes 12 and 14 is initially triggered by the saturation of transformer core 44. Thus for effective core saturation control, R should be large. $B_{sat}$, $\mu$ and K are fixed when the transformer core 44 is selected. For a given tube or transistor, $I_{sat}$ has a limited range beyond which an excessive grid or base drive is required. $N_p$ is therefore the most useful design variable, and should be made as large as possible, within limitations imposed by primary and output leakage inductances.

Figure 3:
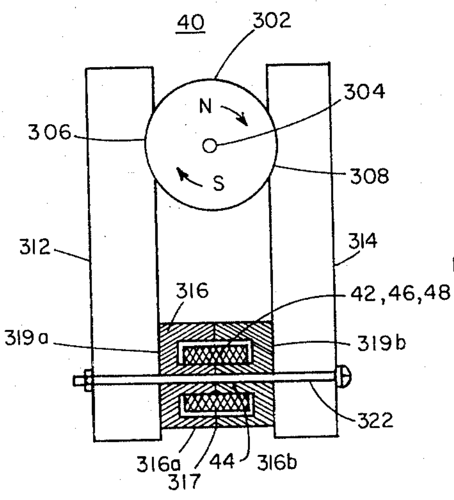
FIGURE 3 is an elevation view in section of a transformer designed for use with the instant blocking oscillator; and, FIGURE 4 is a schematic diagram of a transistorized blocking oscillator utilizing the principles of this invention.

During the core saturation mode of operation in accordance wtih the principles of this invention, the effective saturation flux density $B_{sat}$ in Equation 2 would be adjusted to achieve the desired $T_\phi$, and is a convenient manner of pulse width control, as will be seen below. A way to accomplish this control is a direct approach involving the use of a D.C. bias winding (not illustrated) on transformer core 44 which may be used. This arrangement however, suffers from the difficulty that the pulse is coupled into the bias winding, necessitating the use of a current source for the drive. Another, and more preferred approach for exercising control over the saturation point of transformer 40 is to use an external permanent magnet to supply the biasing magnetomotive force directly. This is illustrated in FIGURE 3. An adjustment of the pulse duration in such an arrangement is done mechanically. This arrangement has the advantages that the magnet is automatically stabilized against the maximum demagnetizing influence of the blocking oscilaltor during the adjustment process, and that the biasing field is stable and requires no standing power. For the arrangement in FIGURE 3, it is possible to lengthen the actual width of the pulse, up to a factor of two, it has been found, although when doing so the operation is brought nearer to the current saturation mode of operation; that is, the effective value of R is decreased by the increase in the effective $B_{sat}$.

Referring to FIGURE 3 for a description of the preferred form of transformer 40, a cylindrical biasing magnet 302 is mounted on a shaft 304 for rotation within pole faces 306 and 308 of pole pieces 312 and 314. Magnet 302 provides either an additive or a subtractive flux through core 44 depending on the former's rotational orientation. Core 44 is the internal cylindrical portion of leg 316 which is a two piece element, 316*a* and 316*b*, abutting at 317, each including an end wall 319*a* and 319*b* abutting against pole pieces 312 and 314, and core 44 which is supported on a bolt 322 of non-magnetic material which holds the assembly together. Core 44 is common to the primary magnetic circuit consisting of legs 312 and 314, and magnet 302 and the secondary circuit within leg 316. Core 44 has the smallest cross-sectional area in the magnetic loops, and it is its saturation which determines the pulse duration. Coils 42, 46 and 48 are mounted around core 44 and bolt 322.

In the use of transformer 40, magnet 302 is rotated to obtain the proper biasing for the pulse width desired.

Figure 4:
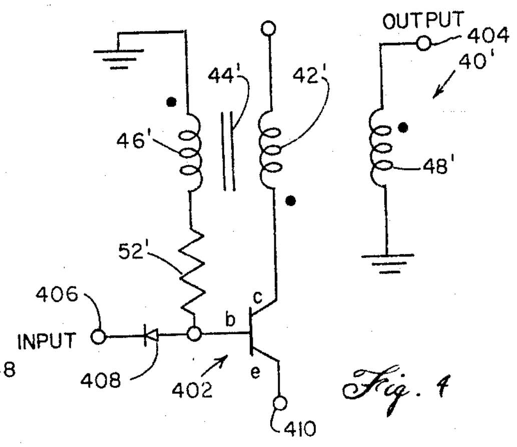

A typical application of the invention to a one shot blocking oscillator utilizing a transistor active element is shown in FIGURE 4. Transistor 402 here is of PNP variety with its collector *c* connected to B— through primary coil 42′ of transformer 40′. The latter has a core 44′, a secondary coil 46′ connected between base *b* and ground via resistor 52′, and an output coil 48′ connected between output contact 404 and ground. The negative input pulse is placed on contact 406 and passes through diode 408 to base *b*. A relatively positive bias is placed on emitter *e* by way of contact 410. The coils 42′, 46′, and 48′ have the orientation as illustrated by the black dots.

In the operation of the transistor circuit of FIGURE 4, an increasingly negative signal on base *b* causes voltage drop across primary coil 42′ due to a sharply amplified current flow which results in a sharply increasing negative voltage on base *b* due to the relative polarities of coils 42′ and 46′. This in turn causes an increasing current through primary 42′ until saturation of transformer core 44′ occurs as previously described in connection with the circuit of FIGURE 1, and which triggers saturation of transistor 402. The design parameters for this circuit are therefore similar to those of the vacuum tube circuit for carrying out the principles of this invention.

It is thus seen there has been provided a core saturation control for blocking oscillators effective to minimize the effect on pulse duration of a tube or transistor aging, ambient temperature, and variation in transistor characteristics (if used). It is also useful for providing a wide range of control of pulse duration by simple mechanical or electrical means.

I claim:

1. A core saturation controlled blocking oscillator comprising an active component having an input element and an output element for producing a square pulse in response to a triggering pulse on said input element, and transformer means having a saturable core between said output element and said input element for providing positive feedback for initiating said square pulse in response to said triggering pulse and degeneration due to saturation of said transformer core for terminating said square pulse, said transformer means having a closed magnetic circuit including said saturable core and permanent magnet means in series, the latter being adjustable in orientation for establishing bias flux in said saturable core thereby selecting the point at which said saturation takes place.

2. A core saturation controlled blocking oscillator for producing a square pulse in response to a triggering pulse comprising the combination of active means having an input element and an output element, transformer means having a primary coil, a secondary coil, and a saturable core, the latter being saturable at a primary current less than the saturation current of said active means, and means connecting said transformer means as positive feedback with the primary coil connected to said output element and the secondary coil to said input element, said saturable core consisting of members forming a magnetic loop including a saturable section of smaller cross-sectional area thereby saturable at flux values less than the remaining portions of said loop, permanent magnet means mounted in said loop for rotation to establish a bias flux in said loop, and a second magnetic loop including said saturable section, said primary and secondary coils mounted to provide magnetic coupling therebetween through said saturable section and to utilize said second magnetic loop to provide a continuous flux path through said section.

3. A core saturation controlled blocking oscillator for producing a square pulse in response to a triggering pulse comprising active means having input means and output means, transformer means having a primary coil, a secondary coil, and a core with a saturable section, the latter being saturable at a primary current less than the saturation current of said active means, and means connecting said transformer means as positive feedback with the primary coil connected to said output means and the secondary coil to said input means, said core consisting of a closed magnetic circuit with first permanent magnet means for establishing a steady magnetic flux through said saturable section and second permanent magnet means adjustable in orientation to permit the magnetic flux contributed therefrom to be added and subtracted in variable selected amounts to and from the flux contributed by said first magnet means thereby to bias said saturable section and so select the primary current at which said core will saturate, thereby making the termination edge of said square pulse selectable.

References Cited in the file of this patent

UNITED STATES PATENTS

| | | |
|---|---|---|
| 2,605,423 | Bess | July 29, 1952 |
| 2,717,961 | Johnstone | Sept. 13, 1955 |
| 2,740,047 | Bayliss | Mar. 27, 1956 |
| 2,838,669 | Horsch | June 10, 1958 |
| 2,846,581 | Volkers | Aug. 5, 1958 |
| 2,886,706 | Rogers | May 12, 1959 |
| 2,903,677 | Curtis | Sept. 8, 1959 |
| 2,908,870 | Hardin et al. | Oct. 13, 1959 |
| 2,964,716 | Berman | Dec. 13, 1960 |